(12) United States Patent
Zhang et al.

(10) Patent No.: US 11,281,274 B2
(45) Date of Patent: Mar. 22, 2022

(54) METHOD FOR USB POWER RECEIVING DEVICE SELECTING POWER SUPPLY OPTION

(71) Applicant: REALTEK SEMICONDUCTOR CORPORATION, Hsinchu (TW)

(72) Inventors: Congyu Zhang, Changshu (CN); Haichao Zheng, Yueqing (CN); Chen Shen, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 11 days.

(21) Appl. No.: 16/908,918

(22) Filed: Jun. 23, 2020

(65) Prior Publication Data

US 2021/0034125 A1 Feb. 4, 2021

(30) Foreign Application Priority Data

Jul. 29, 2019 (CN) .......................... 201910688594.2

(51) Int. Cl.
| | | |
|---|---|---|
| *G06F 1/26* | (2006.01) | |
| *G06F 1/28* | (2006.01) | |
| *G06F 7/24* | (2006.01) | |
| *G06F 13/38* | (2006.01) | |

(52) U.S. Cl.
CPC ................ *G06F 1/266* (2013.01); *G06F 1/28* (2013.01); *G06F 7/24* (2013.01); *G06F 13/387* (2013.01); *G06F 2213/0042* (2013.01)

(58) Field of Classification Search
CPC .......... G06F 1/266; G06F 1/28; G06F 1/3203; G06F 7/24; G06F 13/387; G06F 13/4282; G06F 2213/0042
See application file for complete search history.

(56) References Cited

U.S. PATENT DOCUMENTS

| | | | |
|---|---|---|---|
| 2014/0208134 A1* | 7/2014 | Waters | ................ G06F 13/4282 |
| | | | 713/310 |
| 2017/0031403 A1 | 2/2017 | Waters | |
| 2017/0185126 A1* | 6/2017 | Trethewey | .............. H02J 50/80 |
| 2017/0279270 A1* | 9/2017 | Motoki | .................. H01B 11/02 |
| 2017/0358947 A1* | 12/2017 | Waters | ............. H02J 13/00016 |

(Continued)

OTHER PUBLICATIONS

"USB PD Power Negotiations". Application Report SLVA842. Nov. 2016. Texas Instruments Incorporated. (Year: 2016).*

(Continued)

*Primary Examiner* — Thomas J. Cleary
(74) *Attorney, Agent, or Firm* — WPAT, PC (57) ABSTRACT

Disclosed is a method for a USB power receiving device selecting a power supply option. The method is performed by the USB power receiving device and includes: receiving N power data object(s) (PDO(s)) from a USB power supplying device, in which the N is a positive integer; checking whether at least one of M PDO(s) of the USB power receiving device matches at least one of the N PDO(s) according to a selection rule including a voltage requirement and a current-related requirement and accordingly generating a request data object (RDO), in which the M is a positive integer; and transmitting the RDO to the USB power supplying device to request the USB power supplying device to supply power to the USB power receiving device according to the RDO.

20 Claims, 6 Drawing Sheets

(56) References Cited

U.S. PATENT DOCUMENTS

2018/0183340 A1* 6/2018 Waters .................. H02M 3/157
2020/0073455 A1* 3/2020 Na .......................... G06F 1/266

OTHER PUBLICATIONS

OA letter of the counterpart TW application (appl. no. 108128333) mailed on Jun. 11, 2020. Summary of the OA letter: Claim 6 is rejected as being unpatentable over the cited reference 1 (US 2017/0031403A1) in view of the common knowledge of this technical filed.

* cited by examiner

METHOD FOR USB POWER RECEIVING DEVICE SELECTING POWER SUPPLY OPTION

BACKGROUND OF THE INVENTION

1. Field of the Invention

The present invention relates to USB techniques, especially to USB power receiving techniques.

2. Description of Related Art

The current USB Power Delivery (PD) specification specifies the source capability of a power supplying device and the sink capability of a power receiving device. The source/sink capability can optionally be considered a plurality of power options. Each of the power options is called a power data object (PDO) which is a packet carrying a power regulation and transmitted via a configuration channel of a USB Type-C connector. According to the USB PD specification, each of the power supplying device and power receiving device includes a PDO specifying 5V setting and is allowed to include seven PDOs at most; the maximum voltage setting and maximum power setting specified by each PDO are not higher than 20V and 100 W respectively.

The current USB PD specification does not specify how to select a PDO of a power supplying device according to a PDO of a power receiving device. However, in a circumstance that a user prefers safe charging, even though a power receiving device includes PDOs specifying 5V setting, 9V setting, etc., the user will prefer to have the power receiving device select a PDO of a power supplying device specifying low voltage setting (e.g., 5V setting); and in a circumstance that the user prefers quick charging, the user will prefer to have the power receiving device select a PDO of the power supplying device specifying high voltage setting and high power setting. In light of the above, a technique capable of selecting a PDO of a power supplying device according to a PDO of a power receiving device will be very useful.

SUMMARY OF THE INVENTION

An object of the present disclosure is to disclose a method for a USB power receiving device selecting a power supply option. This method is an improvement over the prior art.

An embodiment of the method of the present disclosure is performed by a USB power receiving device to select a power supply option. This embodiment includes the following steps: receiving N power data object(s) (PDO(s)) from a USB power supplying device, in which the N is a positive integer; and checking whether at least one of M PDO(s) of the USB power receiving device matches at least one of the N PDO(s) according to a selection rule and accordingly generating a request data object (RDO), and then transmitting the RDO to the USB power supplying device, in which the M is a positive integer, the selection rule includes K electrical requirements, and the K is an integer greater than one. The above-mentioned RDO is generated with one of the following steps: in a circumstance that at least one of the M PDO(s) completely matches at least one of the N PDO(s), selecting one of the M PDO(s) as a selected PDO and one of the N PDO(s) as a first matched PDO according to the selection rule and then generating the RDO according to the first matched PDO, in which the selected PDO and the first matched PDO jointly fill the K electrical requirements and therefore match completely; and in a circumstance that none of the M PDO(s) completely matches any of the N PDO(s), selecting one of the M PDO(s) as the selected PDO and one of the N PDO(s) as a second matched PDO according to the selection rule and then generating the RDO according to the second matched PDO, in which the selected PDO and the second matched PDO jointly fill P electrical requirement(s) of the K electrical requirements rather than all of the K electrical requirements and therefore match incompletely, and the P is a positive integer smaller than the K.

Another embodiment of the method of the present disclosure is performed by a USB power receiving device, and includes the following steps: receiving N power data object(s) (PDO(s)) from a USB power supplying device, in which the N is a positive integer; checking whether at least one of M PDO(s) of the USB power receiving device matches at least one of the N PDO(s) according to a selection rule and accordingly generating a request data object (RDO), in which the M is a positive integer and the selection rule includes a voltage requirement and a current-related requirement; and transmitting the RDO to the USB power supplying device.

A further embodiment of the method of the present disclosure is performed by a USB power receiving device, and includes the following steps: receiving N power data object(s) (PDO(s)) from a USB power supplying device, in which the N is a positive integer; and selecting one of M PDO(s) of the USB power receiving device as a selected PDO according to a selection rule and selecting one of the N PDO(s) as a matched PDO according to the selection rule, and accordingly generating a request data object (RDO), in which the M is a positive integer, the selection rule includes a first electrical requirement and a second electrical requirement, the selected PDO and the matched PDO fill both of the first electrical requirement and the second electrical requirement or fill the first electrical requirement without filling the second electrical requirement; and transmitting the RDO to the USB power supplying device. In a circumstance that the selected PDO and the matched PDO fill the first electrical requirement without filling the second electrical requirement, a combination of any of the M PDO(s) and any of the N PDO(s) does not fill the first electrical requirement and the second electrical requirement simultaneously.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present disclosure discloses a method for a USB power receiving device selecting a power supply option. The method is performed by a known or self-developed USB power receiving device (e.g., an electronic device/appliance including a USB Power Delivery IC (USB PD IC)) and allows the USB power receiving device to select a power data object (PDO) of a USB power supplying device according to a PDO of the USB power receiving device itself. As a result, the method can fulfill the requirements of the USB power receiving device.

Figure 1:
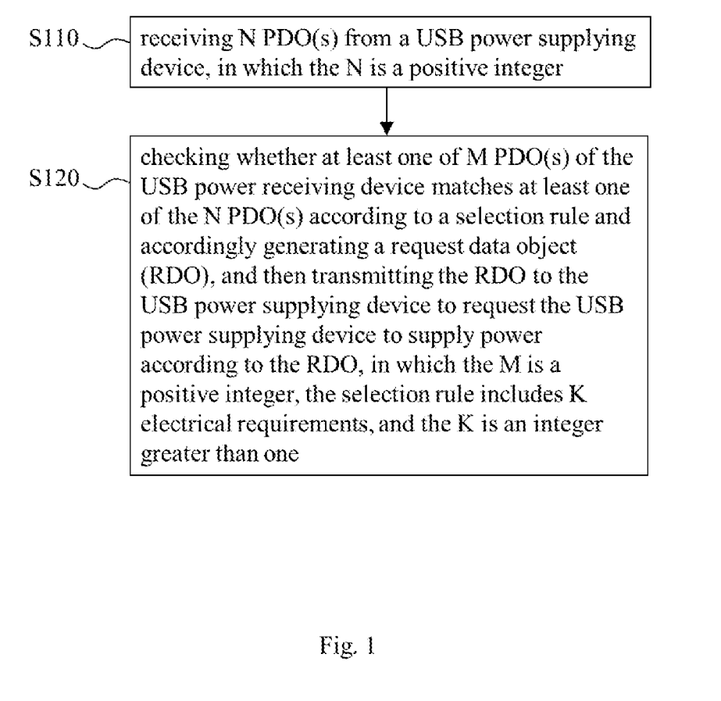
FIG. 1 shows an embodiment of the method of the present disclosure.

FIG. 1 shows an embodiment of the method of the present disclosure. The method is performed by a USB power receiving device and includes the following steps:

step S110: receiving N PDO(s) from a USB power supplying device, in which the N is a positive integer. In this embodiment, the N PDO(s) is/are one/several packet(s) transmitted via a USB Type-C interface and conform(s) to the current USB PD specification, but the implementation of the present invention is not limited thereto as long as such implementation is practicable.

step S120: checking whether at least one of M PDO(s) of the USB power receiving device matches at least one of the N PDO(s) according to a selection rule and accordingly generating a request data object (RDO), and then transmitting the RDO to the USB power supplying device to request the USB power supplying device to supply power according to the RDO, in which the M is a positive integer, the selection rule includes K electrical requirements, and the K is an integer greater than one. In this embodiment, the RDO is a packet transmitted via the USB Type-C interface and conforms to the current USB PD specification, but the implementation of the present invention is not limited thereto as long as such implementation is practicable.

Figure 2:
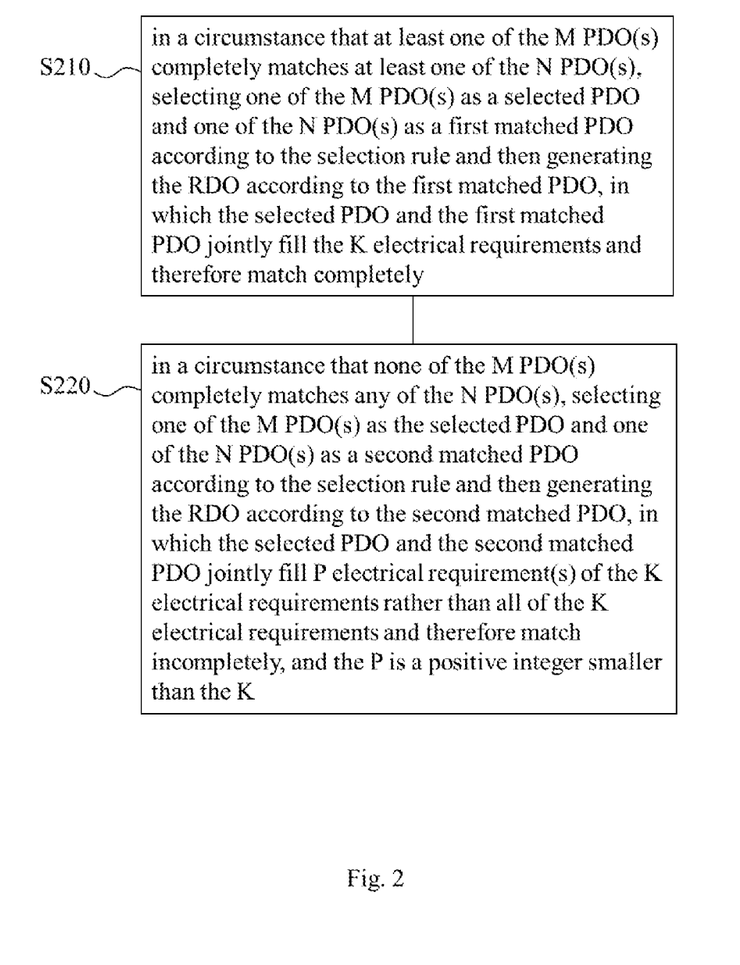
FIG. 2 shows an embodiment of step S120 of FIG. 1.

FIG. 2 shows an embodiment of step S120 of FIG. 1. This embodiment includes one of the following steps:

step S210: in a circumstance that at least one of the M PDO(s) completely matches at least one of the N PDO(s), selecting one of the M PDO(s) as a selected PDO and one of the N PDO(s) as a first matched PDO according to the selection rule and then generating the RDO according to the first matched PDO, in which the selected PDO and the first matched PDO jointly fill the K electrical requirements and therefore match completely. The description "match completely" here means "fill the K electrical requirements completely".

Figure 3A:
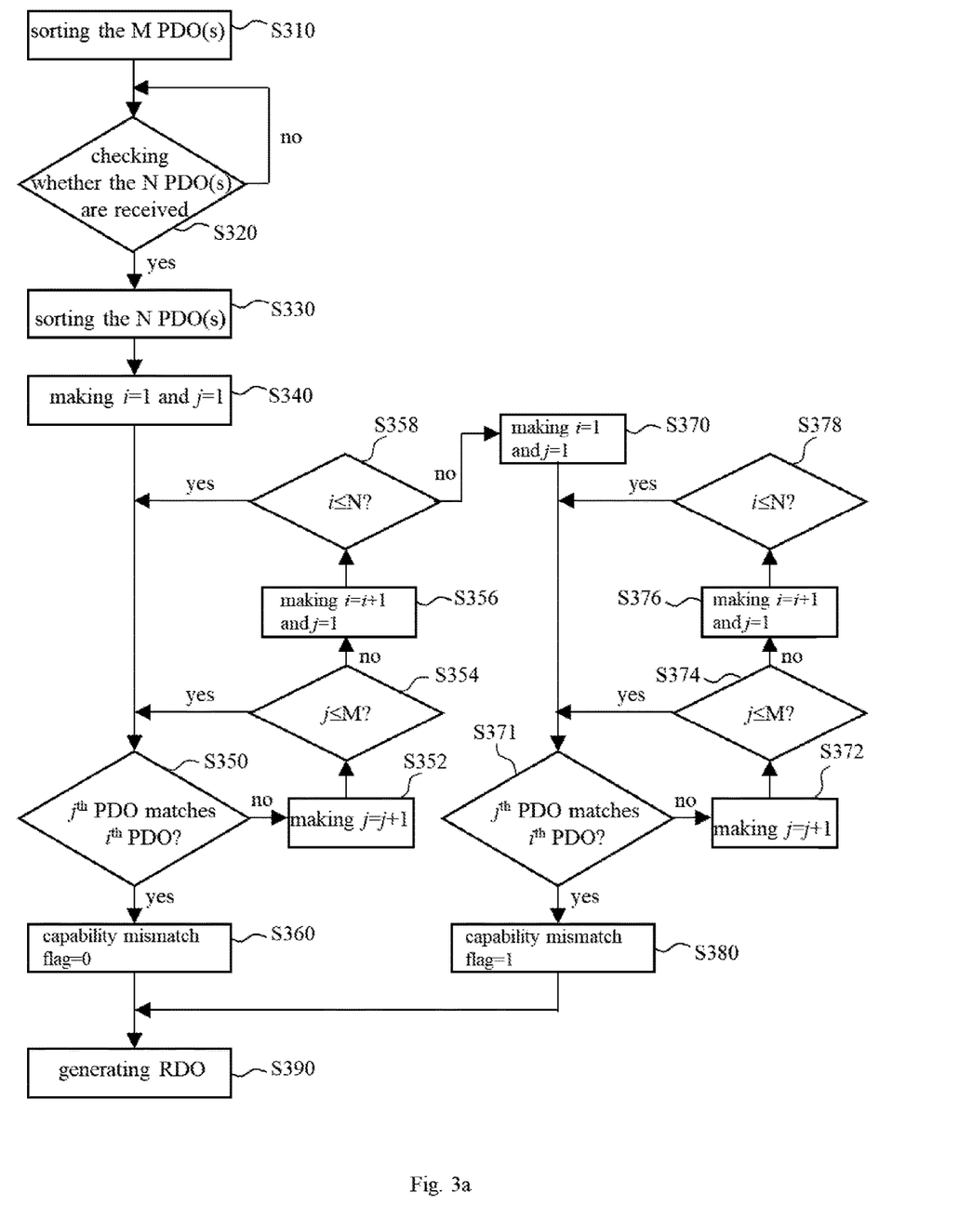
FIG. 3a shows an exemplary implementation in accordance with the embodiments of FIGS. 1-2.
Figure 3B:
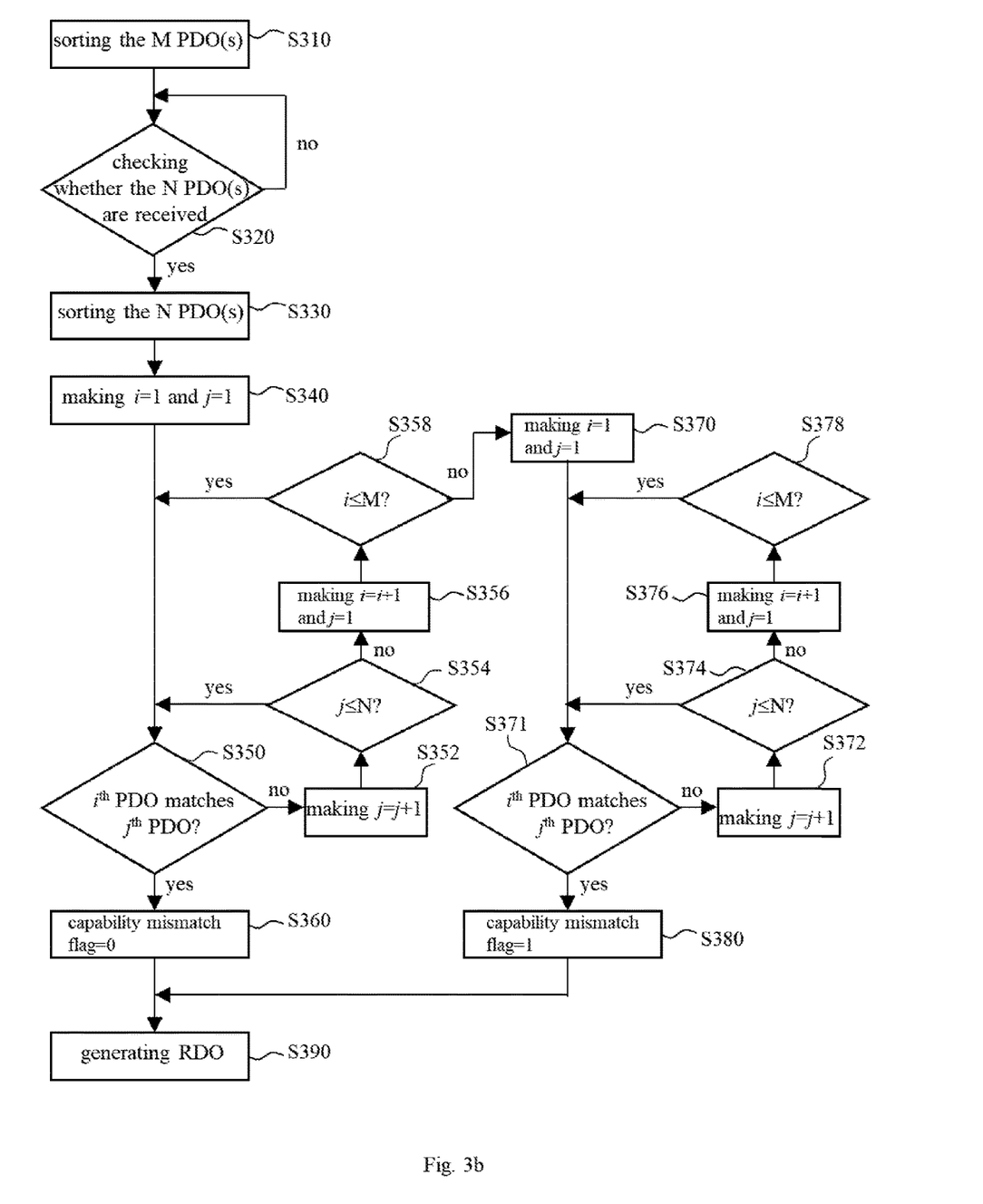
FIG. 3b shows another exemplary implementation in accordance with the embodiments of FIGS. 1-2.

For instance, the M PDOs are a first sink-side PDO with voltage/current setting 5V/3 A (in brief, Fixed Sink PDO1) and a second sink-side PDO with voltage/power setting 9-14.5V/40 W (in brief, Battery Sink PDO2); the N PDOs are a first source-side PDO with voltage/current setting 5V/3 A (in brief, Fixed Source PDO1), a second source-side PDO with voltage/current setting 9-12V/3 A (in brief, Variable Source PDO2), and a third source-side PDO with voltage/power setting 9-12V/40W (in brief, Battery Source PDO3); and the selection rule includes a high power/quick charging rule and the voltage requirement and current-related requirement detailed in a later paragraph. Accordingly, in this instance step S210 picks one of the M PDOs as a sink-side candidate PDO and one of the N PDOs as a source-side candidate PDO according to the high power/quick charging rule (e.g., high power first rule) and then checks whether the two candidate PDOs match according to the voltage requirement and current-related requirement, and if the two candidate PDOs do not match, step S210 picks another pair of candidate PDOs and checks again; step S210 repeats the above procedure till the selected sink-side candidate PDO and the selected source-side candidate PDO are found completely matched. As a result, in this instance step S210 firstly selects the Battery Sink PDO2 from the M PDOs and the Battery Source PDO3 from the N PDOs because the power specified by the two PDOs is higher; if the two PDOs are found completely matched, step S210 treats the Battery Sink PDO2 as the selected PDO and the Battery Source PDO3 as the first matched PDO; and if the two PDOs are not found completely matched, step S210 continues performing the selecting and matching procedure as illustrated in FIGS. 3a-3b according to the selection rule till the selected PDO and the first matched PDO are found. In this instance, the Battery Sink PDO2 and the Battery Source PDO3 jointly fill the voltage requirement and current-related requirement and thus the two PDOs are found completely matched and treated as the selected PDO and the first matched PDO respectively.

For another instance, step S210 determines M×N degrees of match with all combinations of the M PDO(s) and N PDO(s) according to the selection rule, and then selects the optimal degree of match from the M×N degrees of match by the selection rule to determine the first matched PDO, wherein the degrees of match are graded according to the selection rule.

step S220: in a circumstance that none of the M PDO(s) completely matches any of the N PDO(s), selecting one of the M PDO(s) as the selected PDO and one of the N PDO(s) as a second matched PDO according to the selection rule and then generating the RDO according to the second matched PDO, in which the selected PDO and the second matched PDO jointly fill P electrical requirement(s) of the K electrical requirements rather than all of the K electrical requirements and therefore match incompletely, and the P is a positive integer smaller than the K. The description "match incompletely" here means "fill the P electrical requirement(s) completely but fail to fill all the K electrical requirements".

For instance, the M PDOs are a first sink-side PDO with voltage/current setting 5V/3 A (in brief, Fixed Sink PDO1) and a second sink-side PDO with voltage/power setting 9-14.5V/45W (in brief, Battery Sink PDO2); the N PDOs are a first source-side PDO with voltage/current setting 5V/2.5 A (in brief, Fixed Source PDO1), a second source-side PDO with voltage/current setting 9-12V/3 A (in brief, Variable Source PDO2), and a third source-side PDO with voltage/power setting 9-12V/40W (in brief, Battery Source PDO3); and the selection rule includes a high power/quick charging rule and the voltage requirement detailed in a later paragraph. Accordingly, in this instance step S220 picks one of the M PDOs as a sink-side candidate PDO and one of the N PDOs as a source-side candidate PDO according to the high power/quick charging rule (e.g., high power first rule) and then checks whether the two candidate PDOs match according to the voltage requirement, and if the two candidate PDOs do not match, step S220 picks another pair of candidate PDOs and checks again; step S210 repeats the above procedure till the selected sink-side candidate PDO and the selected source-side candidate PDO are found matched. In light of the above, step S220 selects the Battery Sink PDO2 from the M PDOs and the Battery Source PDO3 from the N PDOs according to fewer electrical requirement(s) (i.e., the voltage requirement without the aforementioned current-related requirement) in comparison with step S210; if the two PDOs are found completely matched, step S220 treats the Battery Sink PDO2 as the selected PDO and the Battery Source PDO3 as the second matched PDO; and if the two PDOs are not completely matched, step S220 continues performing the selecting and matching procedure as illustrated in FIGS. 3a-3b according to the selection rule till the selected PDO and the second matched PDO are found. In this instance, the Battery Sink PDO2 and the Battery Source PDO3 jointly fill the voltage requirement, but they do not fill the current-related requirement (e.g., power requirement); accordingly, the two PDOs match incompletely.

For another instance, step S220 determines M×N degrees of match with all combinations of the M PDO(s) and N PDO(s) according to the selection rule, and then selects the optimal degree of match from the M×N degrees of match by the selection rule to determine the second matched PDO, wherein the degrees of match are graded according to the selection rule.

In an exemplary implementation, a type of each of the N PDO(s) is one of a fixed source PDO, a variable source PDO, and a battery source PDO; a type of each of the M PDO(s) is one of a fixed sink PDO, a variable sink PDO, and a battery sink PDO; and the K electrical requirements include a voltage requirement. This voltage requirement includes: in a circumstance that the type of the selected PDO is the fixed sink PDO (e.g., the Fixed Sink PDO1 of step S210), the type of the first/second matched PDO should be the fixed source PDO (e.g., the Fixed Source PDO1 of step S210) and a constant voltage specified by a voltage regulation of the selected PDO should be the same as a constant voltage specified by a voltage regulation of the first/second matched PDO; and in a circumstance that the type of the selected PDO is one of the variable sink PDO and the battery sink PDO (e.g., the Battery Sink PDO2 of step S210/S220), the type of the first/second matched PDO should be one of the variable source PDO and the battery source PDO (e.g., the Battery Source PDO3/Variable Source PDO2 of step S210 or the Battery Source PDO3/Variable Source PDO2 of step S220) and a voltage range specified by the voltage regulation of the selected PDO should include the constant voltage or a voltage range specified by the voltage regulation of the first/second matched PDO.

In an exemplary implementation, the K electrical requirements include a current-related requirement that is not included in the P electrical requirement(s). The current-related requirement includes at least one of the following requirements: a current requirement used for requesting the maximum current specified by a current regulation of the first matched PDO to be larger than an operational current specified by a current regulation of the selected PDO; and a power requirement used for requesting the maximum power specified by a power regulation of the first matched PDO to be higher than an operational power specified by a power regulation of the selected PDO. The definitions of the operational current and operational power are found in the current USB PD specification, but the implementation of the present invention is not limited thereto.

In an exemplary implementation, in a circumstance that at least one of the M PDO(s) fully matches at least one of the N PDO(s), the step for selecting one of the M PDO(s) as the selected PDO includes: sorting the M PDO(s) according to a first sorting rule (e.g., high power/quick charging rule) and thereby obtaining a first sorting result; and selecting one of the M PDO(s) as the selected PDO according to the first sorting result as illustrated in FIGS. 3a-3b, in which none of the M PDO(s) not only fills the K electrical requirements but also has a ranking of PDOs of the first sorting result higher than a ranking of the selected PDO of the first sorting result. In this exemplary implementation, the M PDO(s) is/are sorted during the initialization/booting procedure of the USB power receiving device. In this exemplary implementation, the step for selecting one of the N PDO(s) as the first matched PDO includes: sorting the N PDO(s) according to a second sorting rule (e.g., high power/quick charging rule or low power/safe charging rule) and thereby obtaining a second sorting result; and selecting one of the N PDO(s) as the first matched PDO according to the second sorting result as illustrated in FIGS. 3a-3b, in which none of the N PDO(s) not only fully fills the K electrical requirements but also has a ranking of PDOs of the second sorting result higher than a ranking of the first matched PDO of the second sorting result. In this exemplary implementation, the first sorting rule is substantially identical to the second sorting rule. In this exemplary implementation, at least one of the first sorting rule and second sorting rule uses a Quicksort algorithm to sort PDOs. The introduction to the Quicksort algorithm is found in the following website:
https://zh.wikipedia.org/wiki/%E5%BF%AB%E9%80%9F%E6%8E%92%E5%BA%8F.

In an exemplary implementation, in a circumstance that none of the M PDO(s) fully matches any of the N PDO(s), the step for selecting one of the M PDO(s) as the selected PDO includes: sorting the M PDO(s) according to a first sorting rule (e.g., high power/quick charging rule or low power/safe charging rule) and thereby obtaining a first sorting result; and selecting one of the M PDO(s) as the selected PDO according to the first sorting result as illustrated in FIGS. 3a-3b, in which none of the M PDO(s) not only fills the P electrical requirements but also has a ranking of PDOs of the first sorting result higher than a ranking of the selected PDO of the first sorting result. In this exemplary implementation, the M PDO(s) is/are sorted during the initialization/booting procedure of the USB power receiving device. In this exemplary implementation, the step for selecting one of the N PDO(s) as the second matched PDO includes: sorting the N PDO(s) according to a second sorting rule (e.g., high power/quick charging rule or low power/safe charging rule) and thereby obtaining a second sorting result; and selecting one of the N PDO(s) as the second matched PDO according to the second sorting result as illustrated in FIGS. 3a-3b, in which none of the N PDO(s) not only fully fills the P electrical requirements but also has a ranking of PDOs of the second sorting result higher than a ranking of the second matched PDO of the second sorting result. In this exemplary implementation, the first sorting rule is substantially identical to the second sorting rule. In this exemplary implementation, at least one of the first sorting rule and second sorting rule uses a Quicksort algorithm to sort PDOs.

FIG. 3a shows an exemplary implementation in accordance with the embodiments of FIGS. 1-2. This implementation includes the following steps:

step S310: sorting the M PDO(s).
step S320: checking whether the N PDO(s) are received.
step S330: sorting the N PDO(s).
step S340: making i=1 and j=1. The variable "i" is the ordinal number of a PDO of the N PDO(s)'s sorting result and the variable "j" is the ordinal number of a PDO of the M PDO(s)'s sorting result. As shown in FIG. 3b, in an alternative exemplary implementation the variable "i" is the ordinal number of a PDO of the M PDO(s)'s sorting result, and the variable "j" is the ordinal number of a PDO of the N PDO(s)'s sorting result.
step S350: checking whether the $j^{th}$ PDO of the M PDO matches the $i^{th}$ PDO of the N PDO. In the alternative exemplary implementation as shown in FIG. 3b, this step checks whether the $i^{th}$ PDO of the M PDO matches the $j^{th}$ PDO of the N PDO.

step S352: making j=j+1.

step S354: checking whether the variable "j" is not greater than the M. In the alternative exemplary implementation as shown in FIG. 3b, this step checks whether the variable "j" is not greater than the N.

step S356: making i=i+1 and j=1.

step S358: checking whether the variable "i" is not greater than the N. In the alternative exemplary implementation as shown in FIG. 3b, this step checks whether the variable "i" is not greater than the M.

step S360: making a flag for indicating the status of the capability mismatch be zero (i.e., no mismatch).

step S370: making i=1 and j=1.

step S371: checking whether the $j^{th}$ PDO of the M PDO matches the $i^{th}$ PDO of the N PDO. In the alternative exemplary implementation as shown in FIG. 3b, this step checks whether the $i^{th}$ PDO of the M PDO matches the $j^{th}$ PDO of the N PDO.

step S372: making j=j+1.

step S374: checking whether the variable "j" is not greater than the M. In the alternative exemplary implementation as shown in FIG. 3b, this step checks whether the variable "j" is not greater than the N.

step S376: making i=i+1 and j=1.

step S378: checking whether the variable "i" is not greater than the N. In the alternative exemplary implementation as shown in FIG. 3b, this step checks whether the variable "i" is not greater than the M.

step S380: making the flag for indicating the status of the capability mismatch be one (i.e., mismatch).

step S390: generating the RDO.

Since steps S310-S390 are detailed in the description of the embodiments of FIGS. 1-2, repeated and redundant description is omitted here.

Figure 4:
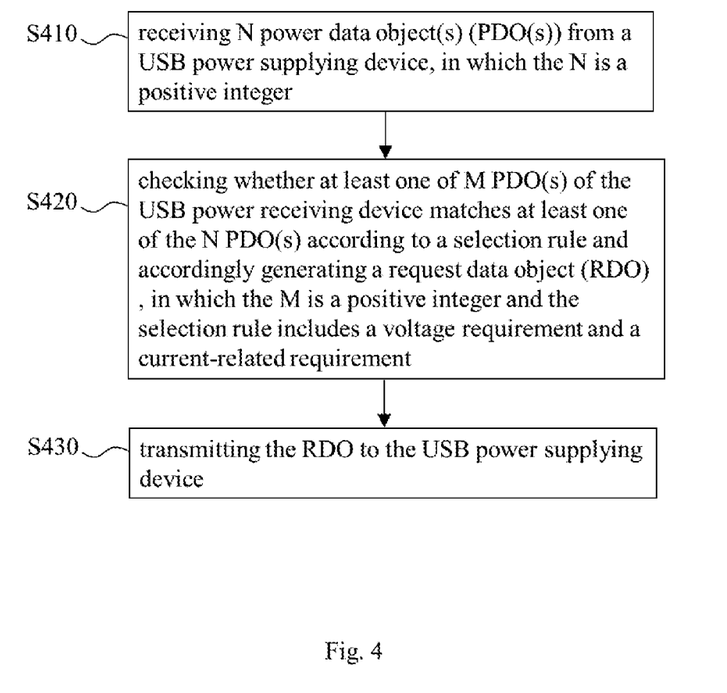
FIG. 4 shows another embodiment of the method of the present disclosure.

FIG. 4 shows another embodiment of the method of the present disclosure performed by a USB power receiving device. This embodiment includes the following steps:

step S410: receiving N power data object(s) (PDO(s)) from a USB power supplying device, in which the N is a positive integer.

step S420: checking whether at least one of M PDO(s) of the USB power receiving device matches at least one of the N PDO(s) according to a selection rule and accordingly generating a request data object (RDO), in which the M is a positive integer and the selection rule includes a voltage requirement and a current-related requirement.

step S430: transmitting the RDO to the USB power supplying device.

Figure 5:
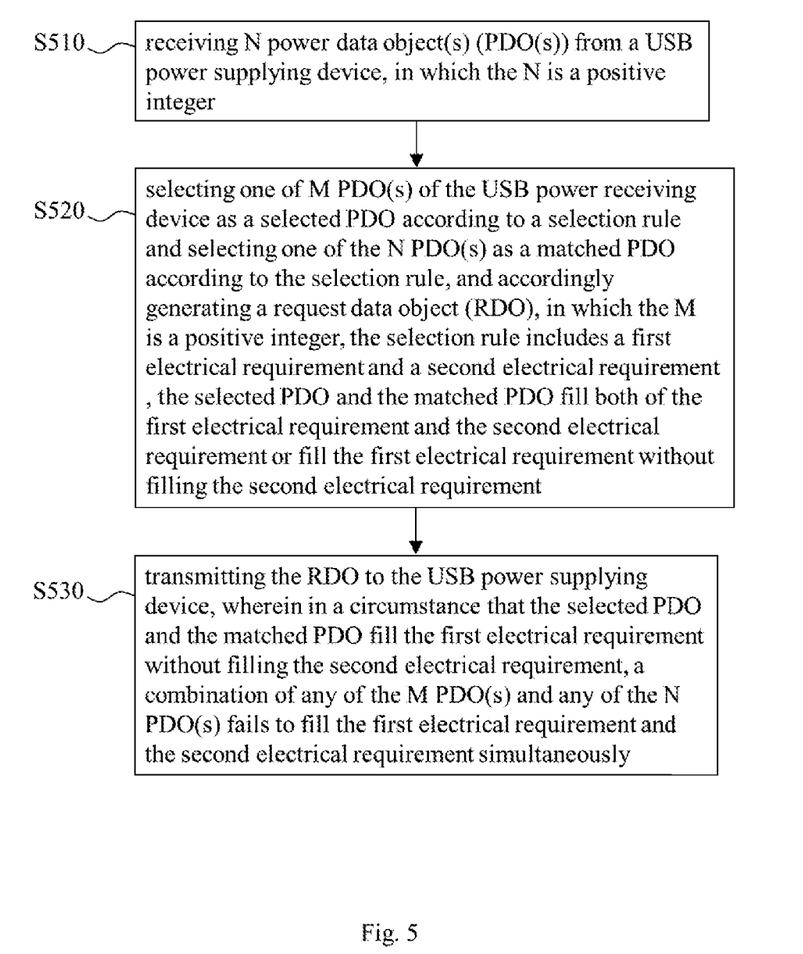
FIG. 5 shows yet another embodiment of the method of the present disclosure.

FIG. 5 shows yet another embodiment of the method of the present disclosure performed by a USB power receiving device. This embodiment includes the following steps:

step S510: receiving N power data object(s) (PDO(s)) from a USB power supplying device, in which the N is a positive integer.

step S520: selecting one of M PDO(s) of the USB power receiving device as a selected PDO according to a selection rule and selecting one of the N PDO(s) as a matched PDO according to the selection rule, and accordingly generating a request data object (RDO), in which the M is a positive integer, the selection rule includes a first electrical requirement and a second electrical requirement, the selected PDO and the matched PDO fill both of the first electrical requirement and the second electrical requirement or fill the first electrical requirement without filling the second electrical requirement.

step S530: transmitting the RDO to the USB power supplying device, wherein in a circumstance that the selected PDO and the matched PDO fill the first electrical requirement without filling the second electrical requirement, a combination of any of the M PDO(s) and any of the N PDO(s) fails to fill the first electrical requirement and the second electrical requirement simultaneously.

Since those of ordinary skill in the art can refer to the disclosure of the embodiments of FIGS. 1-3b to appreciate the detail and modification of the embodiments of FIGS. 4-5, which implies that some or all of the features of the embodiments of FIGS. 1-3b can be applied to the embodiments of FIGS. 4-5 in a reasonable way, repeated and redundant description is omitted here.

It should be noted that people of ordinary skill in the art can implement the present invention by selectively using some or all of the features of any embodiment in this specification or by selectively using some or all of the features of multiple embodiments in this specification as long as such implementation is practicable, which means that the present invention can be carried out flexibly.

To sum up, the method of the present disclosure can select a PDO of a USB power supplying device according to a PDO of a USB power receiving device and therefore fulfill the requirement(s) of the USB power receiving device.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A method performed by a USB power receiving device to select a power supply option, comprising:
   receiving N power data object(s) (PDO(s)) from a USB power supplying device, in which the N is a positive integer; and
   checking whether at least one of M PDOs of the USB power receiving device matches at least one of the N PDO(s) according to a selection rule and accordingly generating a request data object (RDO), and then transmitting the RDO to the USB power supplying device, in which the M is a positive integer greater than one, the selection rule includes K electrical requirements, and the K is an integer greater than one,
   wherein at least one of the M PDOs completely matches at least one of the N PDO(s), and the RDO is generated with following steps:
      selecting one of the M PDOs as a selected PDO and one of the N PDO(s) as a first matched PDO according to the selection rule; and then generating the RDO according to the first matched PDO, in which the selected PDO and the first matched PDO jointly fill the K electrical requirements and therefore match completely, and selecting one of the M PDOs as the selected PDO includes:
         sorting the M PDOs according to a first sorting rule and thereby obtaining a first sorting result; and
         selecting one of the M PDOs as the selected PDO according to the first sorting result.

2. The method of claim 1, wherein both the N and the M are integers greater than one.

3. The method of claim 1, wherein a type of each of the N PDO(s) is one of a fixed source PDO, a variable source PDO, and a battery source PDO, and a type of each of the M PDOs is one of a fixed sink PDO, a variable sink PDO, and a battery sink PDO; and the K electrical requirements include a voltage requirement, and the voltage requirement includes:

in a circumstance that a type of the selected PDO is the fixed sink PDO, a type of a matched PDO is the fixed source PDO and a constant voltage specified by a voltage regulation of the selected PDO is the same as a constant voltage specified by a voltage regulation of the matched PDO, in which the matched PDO is one of the first matched PDO and the second matched PDO; and in a circumstance that the type of the selected PDO is one of the variable sink PDO and the battery sink PDO, the type of the matched PDO is one of the variable source PDO and the battery source PDO and a voltage range specified by the voltage regulation of the selected PDO includes the constant voltage or a voltage range specified by the voltage regulation of the matched PDO.

4. The method of claim 3, wherein the K electrical requirements include a current-related requirement and the current-related requirement includes at least one of following requirements:

a maximum current specified by a current regulation of the first matched PDO is larger than an operational current specified by a current regulation of the selected PDO; and a maximum power specified by a power regulation of the first matched PDO is higher than an operational power specified by a power regulation of the selected PDO.

5. The method of claim 1, wherein the first sorting rule adopts a Quicksort algorithm.

6. The method of claim 1, wherein the K electrical requirements include a current-related requirement, and the current-related requirement includes at least one of following requirements:

a maximum current specified by a current regulation of the first matched PDO is larger than an operational current specified by a current regulation of the selected PDO; and a maximum power specified by a power regulation of the first matched PDO is higher than an operational power specified by a power regulation of the selected PDO.

7. The method of claim 1, wherein the first sorting rule is one of the following: a high power rule; a quick charging rule; a low power rule; and a safe charging rule.

8. The method of claim 1, wherein the N is greater than one, and selecting one of the N PDOs as the first matched PDO includes:

sorting the N PDOs according to a second sorting rule and thereby obtaining a second sorting result; and selecting one of the N PDOs as the first matched PDO according to the second sorting result.

9. The method of claim 8, wherein each of the first sorting rule and the second sorting rule is one of the following: a high power rule; a quick charging rule; a low power rule; and a safe charging rule.

10. The method of claim 9, wherein at least one of the first sorting rule and the second sorting rule adopts a Quicksort algorithm.

11. A method performed by a USB power receiving device to select a power supply option, comprising:

receiving N power data objects (PDOs) from a USB power supplying device, in which the N is a positive integer greater than one;

sorting M PDOs of the USB power receiving device according to a first sorting rule and thereby obtaining a first sorting result, in which the M is a positive integer greater than one;

sorting the N PDOs according to a second sorting rule and thereby obtaining a second sorting result;

checking whether at least one of the M PDOs of the USB power receiving device matches at least one of the N PDOs according to a selection rule, the first sorting result, and the second sorting result, and accordingly generating a request data object (RDO), in which the selection rule includes a voltage requirement and a current-related requirement; and transmitting the RDO to the USB power supplying device.

12. The method of claim 11, wherein at least one of the first sorting rule and the second sorting rule adopts a Quicksort algorithm.

13. The method of claim 11, wherein the RDO is generated with one of following steps:

in a circumstance that at least one of the M PDOs completely matches at least one of the N PDOs, selecting one of the M PDOs as a selected PDO and one of the N PDOs as a first matched PDO according to the selection rule and then generating the RDO according to the first matched PDO, in which the selected PDO and the first matched PDO jointly fill the voltage requirement and the current-related requirement; and in a circumstance that none of the M PDOs completely matches any of the N PDOs, selecting one of the M PDOs as the selected PDO and one of the N PDOs as a second matched PDO according to the selection rule and then generating the RDO according to the second matched PDO, in which the selected PDO and the second matched PDO fill the voltage requirement but fail to fill the current-related requirement.

14. The method of claim 13, wherein a type of each of the N PDOs is one of a fixed source PDO, a variable source PDO, and a battery source PDO, a type of each of the M PDOs is one of a fixed sink PDO, a variable sink PDO, and a battery sink PDO, and the voltage requirement includes:

in a circumstance that a type of the selected PDO is the fixed sink PDO, a type of the first matched PDO is the fixed source PDO and a constant voltage specified by a voltage regulation of the selected PDO is the same as a constant voltage specified by a voltage regulation of the first matched PDO; and in a circumstance that the type of the selected PDO is one of the variable sink PDO and the battery sink PDO, the type of the first matched PDO is one of the variable source PDO and the battery source PDO and a voltage range specified by the voltage regulation of the selected PDO includes the constant voltage or a voltage range specified by the voltage regulation of the first matched PDO.

15. The method of claim 13, wherein the current-related requirement includes at least one of following requirements:

a maximum current specified by a current regulation of the first matched PDO is larger than an operational current specified by a current regulation of the selected PDO; and a maximum power specified by a power regulation of the first matched PDO is higher than an operational power specified by a power regulation of the selected PDO.

16. The method of claim 11, wherein each of the first sorting rule and the second sorting rule is one of the following: a high power rule; a quick charging rule; a low power rule; and a safe charging rule.

17. A method performed by a USB power receiving device to select a power supply option, comprising:
receiving N power data object(s) (PDO(s)) from a USB power supplying device, in which the N is a positive integer; and
checking whether at least one of M PDOs of the USB power receiving device matches at least one of the N PDO(s) according to a selection rule and accordingly generating a request data object (RDO), and then transmitting the RDO to the USB power supplying device, in which the M is a positive integer greater than one, the selection rule includes K electrical requirements, and the K is an integer greater than one,
wherein none of the M PDOs completely matches any of the N PDO(s), and the RDO is generated with following steps:
selecting one of the M PDOs as the selected PDO and one of the N PDO(s) as a second matched PDO according to the selection rule; and then generating the RDO according to the second matched PDO, in which the selected PDO and the second matched PDO jointly fill P electrical requirement(s) of the K electrical requirements rather than all of the K electrical requirements and therefore match incompletely, the P is a positive integer smaller than the K, and selecting one of the M PDOs as the selected PDO includes:
sorting the M PDOs according to a first sorting rule and thereby obtaining a first sorting result; and
selecting one of the M PDOs as the selected PDO according to the first sorting result.

18. The method of claim 17, wherein the N is greater than one, and selecting one of the N PDOs as the second matched PDO includes:
sorting the N PDOs according to a second sorting rule and thereby obtaining a second sorting result; and
selecting one of the N PDOs as the second matched PDO according to the second sorting result.

19. The method of claim 18, wherein at least one of the first sorting rule and the second sorting rule adopts a Quicksort algorithm, and each of the first sorting rule and the second sorting rule is one of the following: a high power rule; a quick charging rule; a low power rule; and a safe charging rule.

20. The method of claim 17, wherein the first sorting rule adopts a Quicksort algorithm, and the first sorting rule is one of the following: a high power rule; a quick charging rule; a low power rule; and a safe charging rule.

* * * * *